Figures 1, 15:
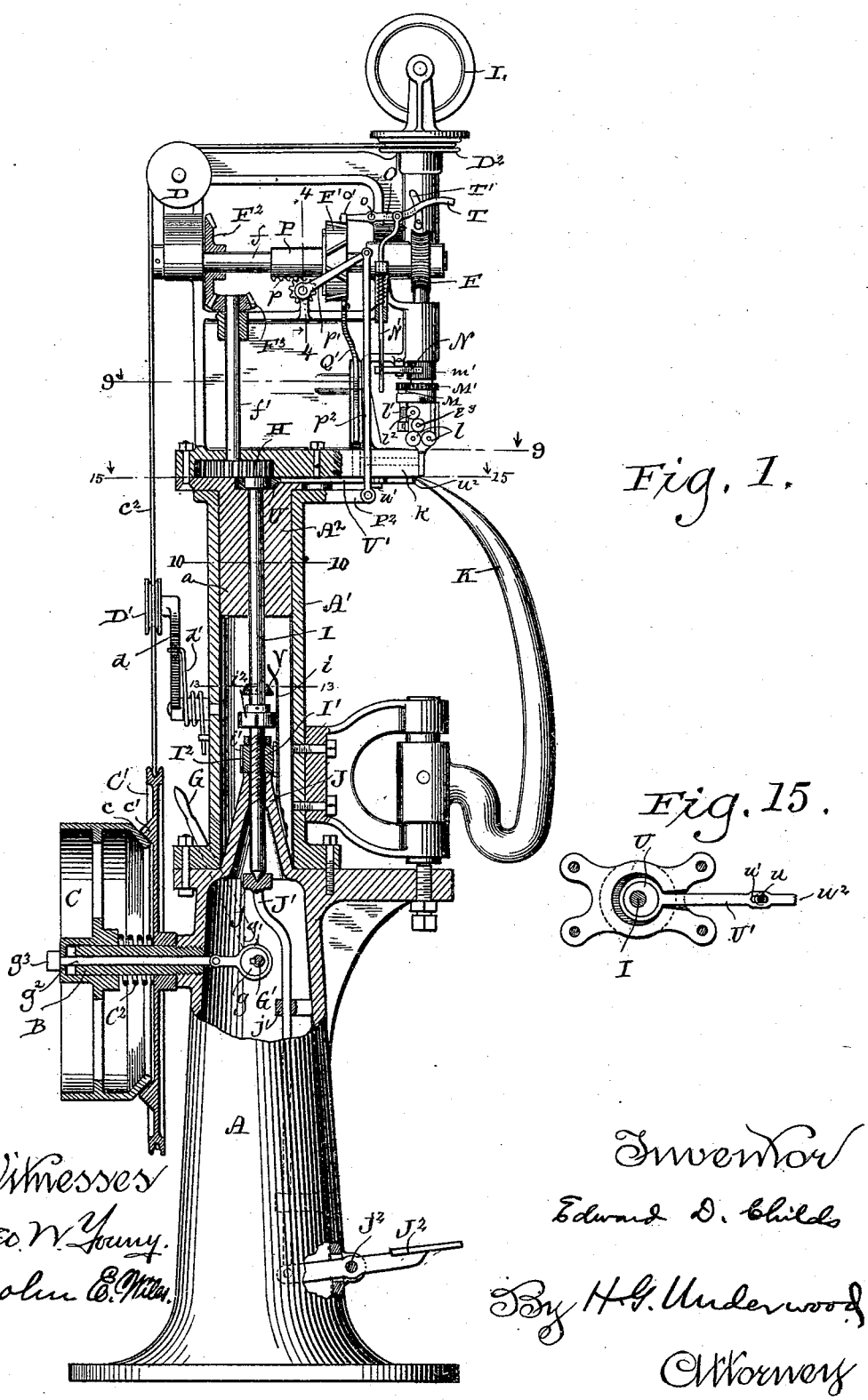

(No Model.) 4 Sheets—Sheet 1.

E. D. CHILDS.
SHOE NAILING MACHINE.

No. 479,784. Patented Aug. 2, 1892.

Witnesses
Geo. W. Young.
John E. Miles.

Inventor
Edward D. Childs

By H. G. Underwood
Attorney (No Model.) 4 Sheets—Sheet 2.
E. D. CHILDS.
SHOE NAILING MACHINE.
No. 479,784. Patented Aug. 2, 1892.
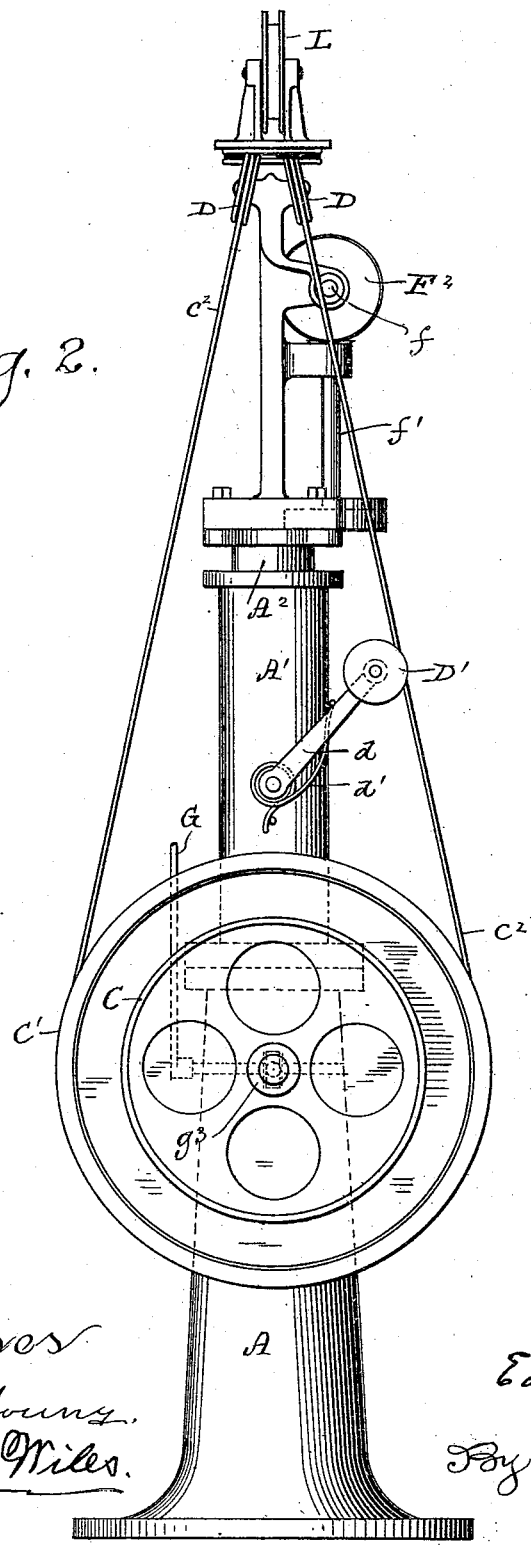
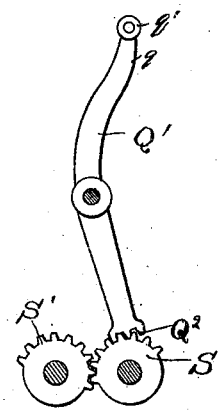
Fig. 2.
Fig. 14.
Witnesses
Geo. W. Young.
John E. Wiles.
Inventor
Edward D. Childs,
By H. G. Underwood
Attorney (No Model.) 4 Sheets—Sheet 3.
E. D. CHILDS.
SHOE NAILING MACHINE.
No. 479,784. Patented Aug. 2, 1892.
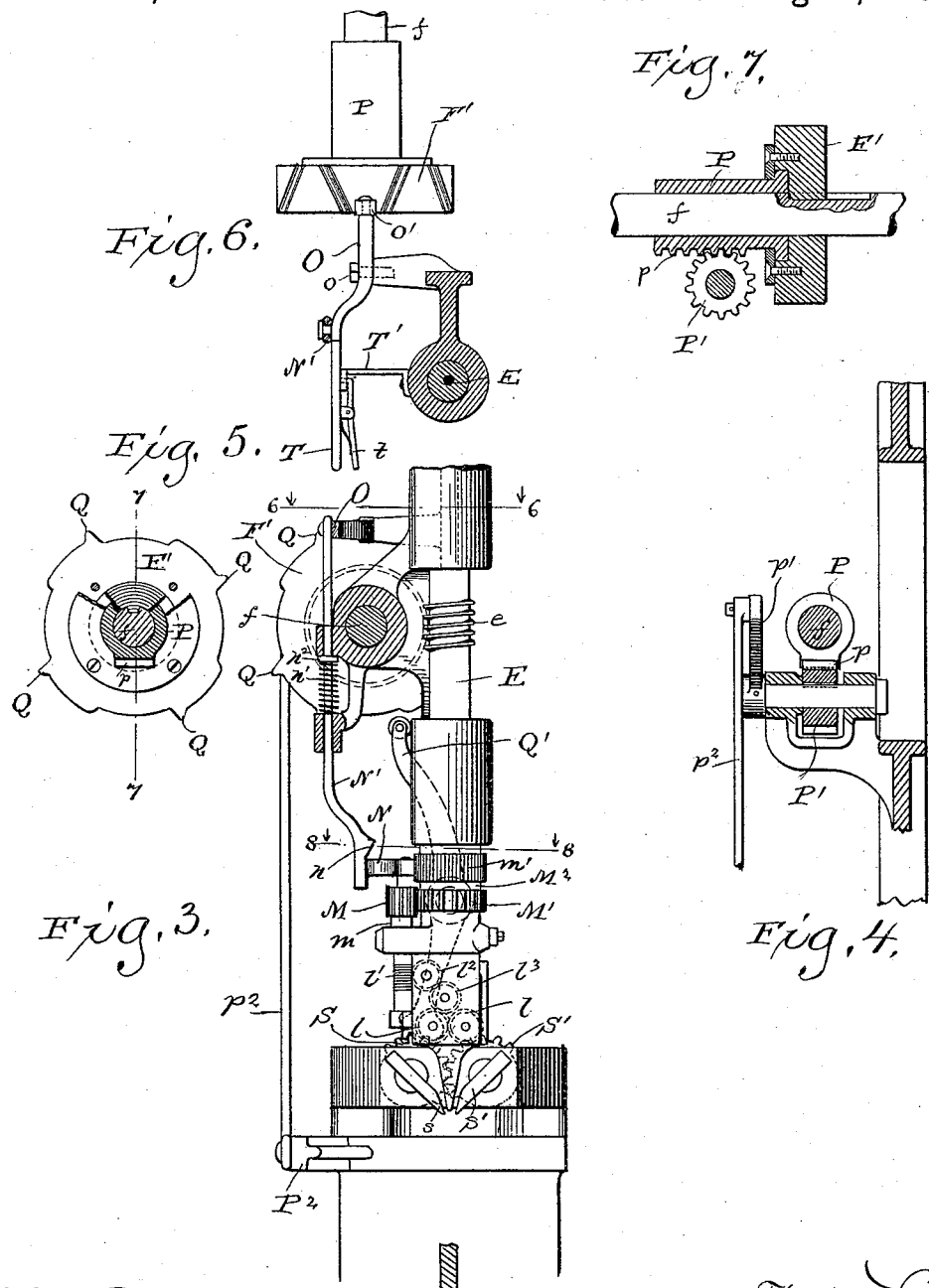

(No Model.) 4 Sheets—Sheet 4.
E. D. CHILDS.
SHOE NAILING MACHINE.
No. 479,784. Patented Aug. 2, 1892.
Fig. 9.
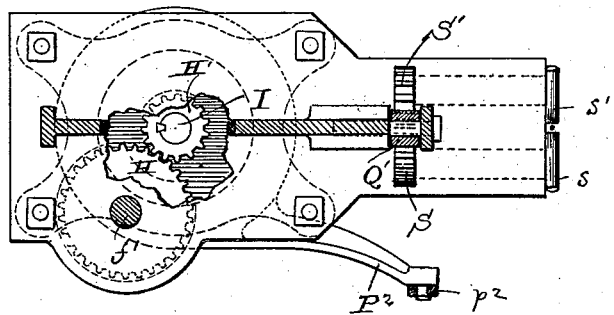
Fig. 10.
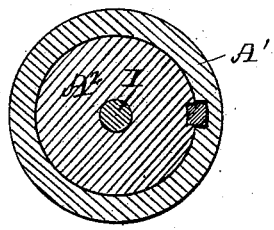
Fig. 12.
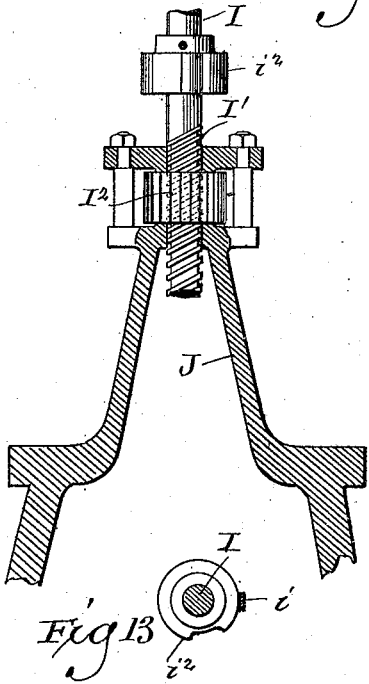
Fig. 11
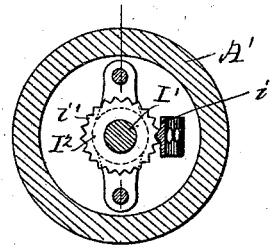
Fig. 13
Witnesses
Geo. W. Young.
John E. Niles.
Inventor
Edward D. Childs.
By H. G. Underwood
Attorney United States Patent Office.

EDWARD D. CHILDS, OF MILWAUKEE, WISCONSIN, ASSIGNOR OF ONE-HALF TO GEORGE W. STROHMEYER AND JOHN F. STROHMEYER, OF SAME PLACE.

SHOE-NAILING MACHINE.

SPECIFICATION forming part of Letters Patent No. 479,784, dated August 2, 1892.

Application filed July 21, 1891. Serial No. 400,248. (No model.)

*To all whom it may concern:*

Be it known that I, EDWARD D. CHILDS, a citizen of the United States, and a resident of Milwaukee, in the county of Milwaukee, and in the State of Wisconsin, have invented certain new and useful Improvements in Shoe-Nailing Machines; and I do hereby declare that the following is a full, clear, and exact description thereof.

My invention relates to new and useful improvements in shoe-nailing machines; and it consists in the matters hereinafter described, and pointed out in the appended claims.

In the accompanying drawings, illustrating my invention, Figure 1 is a side elevation, partly in section, of a shoe-nailing machine embodying my invention. Fig. 2 is a side elevation at right angles to Fig. 1. Fig. 3 is a side elevation of a portion of the nailing-machine with parts broken away, said view being taken from the side of the machine opposite to Fig. 2. Fig. 4 is a detail sectional view on line 4 4 of Fig. 1. Fig. 5 is a detail view of the operating-cam. Fig. 6 is a sectional view on line 6 6 of Fig. 3. Fig. 7 is a detail sectional view on line 7 7 of Fig. 5. Fig. 8 is a detail section on line 8 8 of Fig. 3. Fig. 9 is a sectional view on line 9 9 of Fig. 1. Figs. 10 and 11 are sectional views on lines 10 10 and 11 11 of Fig. 1, respectively. Fig. 12 is a vertical section on line 12 12 of Fig. 11. Fig. 13 is a detail view of a cam for throwing the feeding mechanism into and out of operation. Fig. 14 is a detail view of mechanism for actuating the wire-cutting device, and Fig. 15 a detail view.

In said drawings, A indicates the frame of the machine, which may be of any desired or familiar construction; B, a stud-shaft projecting from one side of the frame A, and upon which is loosely mounted a pulley C, to which power is applied to run the machine. A friction drive-wheel C' is loosely mounted upon the stud-shaft B adjacent to the wheel C, and is provided with a conical bearing-surface $c'$, which engages a correspondingly-shaped bearing-surface $c$ upon the inner edge of the wheel C, as shown in Fig. 1 of the drawings. A spring $C^2$ is located between the two wheels C and C' and bears outwardly upon the hub of the said wheel C, so as to hold said wheel out of engagement with the wheel C' when the parts are in the positions shown in Fig. 1 of the drawings. A cord or belt $c^2$ is trained over the wheel C' and passes upwardly and over idlers D D and around a pulley $D^2$, which is arranged at the upper end of a spindle E, which is provided with an external screw-thread $e$, engaging with a worm-gear F, arranged upon a horizontal spindle or shaft $f$, upon which shaft is also mounted a cam-wheel which governs the feeding mechanism, as will presently be described. A lever G is secured upon the outer end of a shaft G' and serves as a means for oscillating or rocking said shaft. Upon the inner end of said shaft is provided an eccentric $g$, engaged within an eccentric strap $g'$ at the inner end of a reciprocatory spindle $g^2$, which extends outwardly through the interior of the shaft B, and is provided at its outer end with an enlargement $g^3$, adapted to engage the outer end of the hub of the wheel C, as shown in Fig. 1 of the drawings. It follows from this construction that a movement of the lever G from the position shown in said Fig. 1 will by the consequent oscillation of the shaft G' and the eccentric $g$ operate to draw the spindle $g^2$ inwardly, so as to press the wheel C against the wheel C', and thus cause the said wheel C' to operate to drive the mechanism, and that when the lever G is moved back into the position shown in Fig. 1 the spring $C^2$ will serve to move the wheel C out of engagement with the wheel C', thus throwing the machine out of operation.

A bevel-gear $F^2$ is mounted upon the inner end of the shaft $f$ and engages a smaller bevel-gear $F^3$, located at the upper end of a shaft $f'$, which shaft carries at its lower end a gear-wheel H, which engages a pinion H' upon the upper end of a shaft I. The shaft I extends downwardly through the center of the machine-frame and is provided at its lower end with a screw-thread I', which engages a nut $I^2$. The nut $I^2$ normally rests upon the upper side of a support J, formed upon the inside of the machine-frame, and the screw-threaded lower end of the shaft I projects downwardly through said support and is stepped within a movable supporting-arm J'. The movable supporting-arm J' is passed through a guide $j'$ and is engaged at its lower end by the inner end of a foot-lever J², which is pivoted to the frame of the machine at $j^2$. A downward pressure upon the lever J² will obviously operate to elevate the supporting-arm J', thus acting upon the lower end of the screw-threaded spindle I and raising said spindle and the parts of the machine supported thereby.

As shown in the drawings, the machine-frame is composed of two parts A' and A², the latter being provided with a downwardly-extending portion $a$, which is movably engaged within the hollow upper end of the portion A'. Within the movable portion A² the gears H and H' are mounted and are arranged to bear upwardly against said movable part, so that any upward movement of the spindle I, as before described, will cause the entire upper portion of the machine to rise bodily.

K indicates the anvil, upon which the shoe is placed while being nailed. A laterally-projecting portion $k$ upon the movable upper portion of the machine-frame extends over the upper end of the anvil K and serves to press the sole of the shoe firmly down upon the anvil while the nails are being driven.

L indicates the spool upon which the strand of wire is wound, said wire being preferaby of a twisted or screw-threaded form. The strand of wire is passed downwardly through a central bore which extends longitudinally through the vertical shaft E and is engaged at its lower end by any suitable feeding mechanism—such, for instance, as that shown in a prior patent granted to me December 23, 1890, No. 443,357 or any other desired form of feeding device may be employed. The form of feeding mechanism shown in the drawings, however, is substantially the same as that shown in my said prior patent and consists of two feed-rollers $l\ l$, between which the wire is fed, said rollers being arranged so as to tightly grip the wire and to hold the same firmly against upward movement. Motion is given to the rollers $l\ l$ by means of gears upon the outer ends of said rollers, which mesh with a gear $l^3$, which is in turn driven by a gear $l^2$. A worm-gear $l'$ is provided at the lower end of a vertical shaft $m$, which is provided at its upper end with a pinion M, engaging with a gear M' upon the lower end of the vertical shaft E, said gear being located at the lower end of a sleeve M², which turns loosely upon the lower end of said shaft. A ratchet-wheel $m'$ is provided at the upper end of said sleeve and is engaged at certain times by a pawl N, which is pivoted upon a non-rotative part of the frame.

The feeding mechanism mounted upon the lower end of the shaft E is carried around bodily by the rotation of said shaft, and except when the pawl N is engaged with the ratchet-wheel $m'$ the feed-rolls are idle. A depending arm N' is located adjacent to the pawl N, said arm being provided with an inclined or oblique portion $n$, arranged to engage the free end of the pawl by a vertical movement of said arm. A spring $n'$ bears against a projection or shoulder $n^2$ on said arm and serves to press said arm upwardly at times, so as to cause the incline on the said arm to move out of engagement with the free end of said pawl. The upper end of said arm is connected with a pivoted lever O, which is pivotally connected with the frame of the machine at $o$ and is provided at one end with a roller $o'$, arranged to engage with the surface of the cam-wheel F', so that when said roller is in engagement with one of the depressions in said cam-surface the other end of said lever will be raised and the arm N' also raised, so as to move the inclined portion thereof out of engagement with the free end of said pawl, thus permitting the said pawl to remain in engagement with the ratchet-wheel $m'$, so as to hold said wheel from rotation. By the rotation of the shaft E the pinion M is carried around the stationary-gear M', and by its engagement therewith is caused to rotate so as to operate the worm-gear $l'$ and the feeding-rolls $l\ l$, as before described. The cam-wheel F' is feathered upon the shaft $f$ and is engaged upon one side by a longitudinally-movable non-rotative collar or sleeve P, by means of which said cam-wheel may be moved longitudinally upon said shaft. A rack $p$ is formed upon the lower side of said sleeve, which rack is engaged by a pinion P', mounted upon the upper portion of the machine-frame. An arm $p'$ is provided upon the said pinion P', to the outer end of which arm is connected a rod $p^2$, which is connected at its lower end with a stationary portion of the frame or the machine P², as shown in Fig. 1 of the drawings. By this arrangement, when the foot-lever J² is operated to raise the upper part of the frame and the operating parts carried thereby, the connection of the rod $p^2$ being with the lower or stationary portion of the machine-frame, said rod will operate to rotate the arm $p''$, so as to turn the pinion P' and cause the sleeve to move toward the front of the machine. This movement of the parts will obviously carry the cam-wheel toward the front of the machine. The surface of said cam-wheel is provided with inclined surfaces and with raised portions and intermediate depressions extending from face to face of said wheel. These raised portions and depressions are made tapering from face to face of said cam-wheel, the raised portions being wider at the front side of the wheel and the depressions being wider at the rear than at the front. By this construction, when the cam-wheel is moved toward the front of the machine by the elevation of the movable upper part of the frame, the roller $o'$ upon the end of the pivoted lever O will be engaged for a longer period of time by the depressions in the surface of the cam-wheel and for a proportionately-shorter period by the raised portions of said surface, so that when said cam-wheel is moved forward the feeding-rolls will operate for a proportionately longer time, and the length of the nails thereby increased in proportion to the said forward movement of the cam-wheel. It follows from this construction that when the upper portion of the frame is raised to admit a thick sole between the top of the anvil and the said movable upper part of the frame the feeding mechanism will be automatically adjusted so as to form nails of a length corresponding to the thickness of the sole, and when the sole is thin the nails will be formed of a correspondingly shorter length. Projections Q Q are formed upon the periphery of the cam-wheel F', and a lever Q' is pivoted to the frame of the machine and provided with an upwardly-extended arm $c$, upon the extremity of which is journaled a roller $c'$, arranged to engage with the periphery of the cam-wheel. At the lower end of said lever is provided a segmental gear $Q^2$, arranged to engage with the teeth of a gear-wheel S, as shown more particularly in Fig. 3 of the drawings, so that when said roller is engaged by one of said projections Q the lever Q' will be moved about its pivotal connection with the frame and the segmental gear upon its lower end will cause said gear-wheel to rotate about its axis. A cutting-blade $s$ is provided upon the axis of the gear S, and a second gear S' is located adjacent to said gear S and arranged to mesh therewith, said gear S' being provided with a cutting-blade $s'$, adapted to work against the edge of the blade $s$. These cutting-blades are arranged upon opposite sides of the strand of wire and are designed to cut the wire into length to form the nails. By the construction above described it is obvious that when the lever Q' is operated by the engagement of its upper end with one of the projections Q upon the cam-wheel F' the gears S S' will be rotated so as to cut the wire off close to the surface of the sole.

It is desirable to have the driving-wheels constantly revolving, so as to obviate the necessity of throwing the shifting-lever G to throw the wheels C and C' into or out of engagement with each other, and in order to permit the wire-feeding mechanism to be thrown out of operation while the work is being adjusted in position upon or removed from the anvil I provide any suitable cut-off mechanism for throwing said wire-feeding mechanism out of operation by hand and for again throwing said feeding mechanism into operation after the work has been properly adjusted in position.

As shown in Figs. 1 and 6, a projecting end T is provided upon the outer end of the lever O, and is arranged to vibrate vertically beside an arc T', arranged upon a bracket upon the upper portion of the frame of the machine. A spring-pawl $t$ is pivoted to the projecting end T of the lever O, and is arranged to engage with a notch or aperture in the arc T' when the said end T is pressed down sufficiently to elevate the rear end of said lever above the cam-wheel F'. By this arrangement the operator is enabled to stop the feed of the wire while he is arranging his work upon the machine when he simply disengages the arm T from the arc T' and permits the rear end of the lever O to drop back into engagement with the cam-wheel F'. Any means for throwing said wire-feeding mechanism into and out of operation may of course be employed in place of the device shown in the drawings. Any means may be also employed to automatically feed or move the shoe upon the anvil, so as to receive a succession of nails in regular order—as, for instance, the device illustrated in Figs. 1 and 15, in which an eccentric U is located upon the upper end of the shaft I and a lever U' is arranged to vibrate horizontally and engaged at one end with said eccentric U. This lever is movably engaged by a pin $u$, which passes through a slot $u'$ in said lever. By the rotation of the shaft I the eccentric U is operated so as to give a longitudinal and also a vibrating motion to said lever. The arrangement is such that as the movable upper portion of the machine is elevated so as to free the work the lever U' is projected forward so as to engage with the edge of the sole of the shoe, when by the vibrating movement of said lever the sole will be shifted into position to receive the next nail. Any means may be also employed to throw the lifting mechanism out of operation while the operator is adjusting his work upon the machine—as, for instance, that shown in Fig. 1, in which V indicates an annular incline or wedge upon the shaft I, arranged to engage with the upper end of the spring-pawl $i$, which is bent inwardly toward the said shaft. By this construction, when the foot-lever is operated so as to elevate the upper portion of the machine to remove or to insert the work the said annular incline will engage said bent end of the spring-pawl, so as to hold said pawl out of engagement with the nut $I^2$. In this manner the operating parts of the machine are entirely thrown out of operation at the convenience of the operator without in anywise affecting the driving mechanism.

The operation of my improved shoe-nailing machine is as follows: The operator depresses the foot-lever, so as to elevate the movable portion of the frame sufficiently to permit the work to be placed in position upon the anvil, when he releases said foot-lever and the upper portion of the machine descends, so as to cause the laterally-projecting portion $k$ to rest upon the sole of the shoe to be nailed. He then moves the hand-lever so as to throw the wheel C into engagement with the wheel C', thus causing the machine to operate. As soon as the machine is thrown into gear, as before described, the cam-wheel begins to revolve, so as to bring the depressions and raised portions of its surface successively into engagement with the rear end of the pivoted lever O, as before described. When said lever is engaged by one of said depressions, the rod N' will be raised so as to cause the incline at its lower end to move out of engagement with the pawl N, thus permitting said pawl to engage with the ratchet-wheel $m'$, and so cause the feed-rolls to operate, as before described. By the construction shown and described the shaft I is caused to rotate constantly. The nut $I^2$ is at times engaged by a spring-pawl $i$, which engages ratchet-teeth $i'$ in the outer surface of said nut, so as to hold the nut from rotation. The rotation of the shaft I will obviously cause said shaft to rise at such times by reason of the screw-threaded engagement of said shaft with the nut $I^2$, thus raising the movable upper portion of the machine-frame and the operating parts carried thereby, so as to permit the operator to shift the work into position to receive the next nail. By the time the shaft I has made one revolution the feeding mechanism will have been operated so as to project the end of the wire sufficiently to form a nail, and by the continuous rotation of the feeding mechanism about the shaft E said wire will be screwed into the sole of the shoe and will pass through said sole and the margin of the upper, so as to secure the same together. This operation of screwing the nail into the sole is obviously effected while the feeding-rolls are operating to project the wire below the guides. As soon as the nail is passed through the sole, as above described, the lever Q' is engaged by one of the projections Q upon the cam-wheel F', so as to cut off the wire close to the surface of the sole, thus leaving the nail in the sole. At this moment the spring $i$ is engaged by a depression in a cam $i^2$ on the shaft I, so as to permit said spring to engage with the ratchet-teeth upon the outside of the nut $I^2$, thereby holding said nut stationary and causing shaft I and the parts carried thereby to rise, as before described. As soon as the spring rides out of engagement with the depression in said cam, so as to move out of engagement with the teeth on the nut, said nut is free to rotate about the screw-threaded end of the shaft I, and the pitch of said screw-threads is made sufficiently abrupt or steep to cause the said nut to turn with the weight of the said shaft I and the parts supported thereby, thereby permitting said shaft to descend until the laterally-extending portion $k$ of the frame again rests upon the sole of the shoe, as before described. When the shaft descends in this manner, the nut $I^2$ spins freely about said shaft and will obviously revolve at a greater speed than said shaft by reason of the steepness of its thread and the application of the weight of said shaft and supported parts thereto. At the time when the nail has been passed through the sole of the shoe the lever Q' is operated in the manner before described to cut off the wire close to the surface of the sole. This operation is repeated until the entire series of nails has been driven and cut off.

The relative sizes of the gears $F^2$ and $F^3$ and the gears H and H' are such as to produce a succession of operations of the movable portions of the machine at a single revolution of the shaft $f$, and the cam-wheel F' is provided with a suitable number of depressions and intermediate raised portions to produce a number of successive operations of the feeding and cutting mechanism equal to the number of operations of the vertical portions of the machine at a single revolution of said cam-wheel. In this manner a number of nails may be driven and cut off at a single rotation of the shaft $f$. By my improved construction, therefore, the driving mechanism may be run at a comparatively slow speed and will produce a comparatively rapid operation of the nailing mechanism, thereby greatly increasing the capacity of the machine for work.

In order to provide for the rise and fall of the vertically-movable portions of the machine without disturbing the operation of the belt which passes over the wheel C' and the pulleys D D and $D^2$, I provide a belt-tightener consisting of a pulley D', journaled at the extremity of a pivoted arm $d$ and arranged to engage with the belt between the wheel C' and one of the pulleys D. A spring $d'$ is engaged with said pivoted arm and with the stationary portion of the machine-frame and serves to press said arm outwardly, so as to cause the pulley D' to bear strongly against the belt, and thus keep said belt tight. By the yielding arrangement of said tightener mechanism the slack of the belt is taken up when the vertically-movable parts descend, and the belt is permitted to extend so as to allow of the upward movement of said parts without strain upon the belt.

Having described my invention, what I claim as new, and desire to secure by Letters Patent of the United States, is—

1. The combination, with the feeding mechanism of a shoe-nailing machine, of a vertical shaft, a vertically-movable head carried by said shaft, said shaft being screw-threaded at its lower end and engaged with a nut, means for giving a continuous rotation to the said shaft, means for holding said nut from rotation at certain portions of the revolution of said shaft, and a support for holding the work in position to receive the nails, substantially as and for the purposes described.

2. The combination, in a shoe-nailing machine, of a vertical shaft carrying a vertically-movable head provided with wire-feeding mechanism, said shaft being screw-threaded at its lower end and engaged with a nut, a movable step for supporting the lower end of said shaft, means for giving a continuous rotation to said shaft, means for holding said nut from rotation at certain portions of the revolution of said shaft, and means for raising and lowering said movable step, substantially as and for the purposes described.

3. The combination, in a shoe-nailing machine, of a shaft extending vertically through the inside of the machine-frame and carrying at its upper end a vertically-movable head provided with wire-feeding mechanism, said shaft having a screw-threaded engagement with a rotary nut at its lower end, a spring-pawl adapted for engagement with said nut, and a cam upon the said shaft adapted for engagement with said spring-pawl upon the rotation of said shaft to free said nut, substantially as and for the purposes described.

4. In a shoe-nailing machine, the combination, with a vertically-movable head carrying feeding-rolls for advancing the strand of wire, of a cam-wheel rotated by the driving-gears, a lever engaged with said cam-wheel at one end and operatively engaged at its other end, and means for throwing said feeding-rolls into and out of operation at successive portions of the rotation of said cam-wheel, substantially as described.

5. In a shoe-nailing machine, the combination, with a vertically-movable head provided with feeding-rolls for advancing the strand of wire, of a cam-wheel rotated by the driving-gears and provided upon its surface with alternate raised portions and depressions extending from face to face of said cam-wheel and made tapering from end to end, a lever adapted to engage with the surface of said cam-wheel at one end and connected at its other end with means for throwing said feeding-rolls into and out of operation at successive stages of the rotation of the said cam-wheel, and means for moving said cam-wheel longitudinally upon the shaft, substantially as described.

6. In a shoe-nailing machine, the combination, with a vertically-movable head provided with feeding-rolls for advancing the strand of wire, of a cam-wheel constantly rotated by the driving-gears, said cam-wheel being provided with alternate raised portions and depressions in its surface, said raised portions and depressions being tapered from end to end, a lever pivoted to the frame of the machine and engaged at one end with the surface of said cam-wheel and at its other end connected with means for throwing the feeding-rolls into and out of operation by the vibration of said lever, a longitudinally-movable collar engaged with said cam-wheel and provided with rack-teeth upon one of its sides, and a pinion journaled upon the movable upper portion of the machine and engaged with said rack-teeth, said pinion being provided with a radial arm engaged at its outer end with a connecting-rod, which rod is secured at its other end to a stationary portion of the machine-frame, whereby said pinion is rotated by an upward movement of the movable portion of the machine-frame, so as to advance said cam-wheel upon its shaft to a distance corresponding to said upward movement of said head, substantially as described.

7. In a shoe-nailing machine, the combination, with a vertically-movable head carrying feeding-rolls for advancing the strand of wire to form the nails, of a cam-wheel rotated by the driving-gears, a lever engaged at one end with said cam-wheel and engaged at its other end with means for throwing the feeding mechanism into and out of operation at successive portions of the rotation of said cam-wheel, and a detent adapted for engagement with said lever to hold it out of engagement with the cam-wheel, substantially as and for the purposes described.

In testimony that I claim the foregoing I have hereunto set my hand, at Milwaukee, in the county of Milwaukee and State of Wisconsin, in the presence of two witnesses.

EDWARD D. CHILDS.

Witnesses:
JOHN E. WILES,
WM. KLUG.